(12) United States Patent
Kinlen et al.

(10) Patent No.: US 10,557,210 B2
(45) Date of Patent: Feb. 11, 2020

(54) DIRECT ELECTROCHEMICAL SYNTHESIS OF DOPED CONDUCTIVE POLYMERS ON METAL ALLOYS

(71) Applicant: The Boeing Company, Seal Beach, CA (US)

(72) Inventors: Patrick John Kinlen, Renton, WA (US); Lawrence Michael Lawless, St. Louis, MO (US)

(73) Assignee: THE BOEING COMPANY, Chicago, IL (US)

(*) Notice: Subject to any disclaimer, the term of this patent is extended or adjusted under 35 U.S.C. 154(b) by 473 days.

(21) Appl. No.: 14/188,259

(22) Filed: Feb. 24, 2014

(65) Prior Publication Data

US 2015/0240378 A1    Aug. 27, 2015

(51) Int. Cl.
| | | |
|---|---|---|
| *C25D 11/24* | (2006.01) | |
| *C25D 11/08* | (2006.01) | |
| *C25D 11/04* | (2006.01) | |
| *C25D 11/26* | (2006.01) | |
| *C25D 9/02* | (2006.01) | |
| *C09D 5/44* | (2006.01) | |
| *C09D 5/08* | (2006.01) | |
| *C08K 5/40* | (2006.01) | |

(52) U.S. Cl.
CPC ............ *C25D 11/246* (2013.01); *C08K 5/40* (2013.01); *C09D 5/088* (2013.01); *C09D 5/44* (2013.01); *C25D 9/02* (2013.01); *C25D 11/04* (2013.01); *C25D 11/08* (2013.01); *C25D 11/26* (2013.01); *C09D 5/4476* (2013.01)

(58) Field of Classification Search
CPC ............ C25D 11/246; C25D 11/02–34; C23F 11/16–165; H01B 1/128
See application file for complete search history.

(56) References Cited

U.S. PATENT DOCUMENTS

| | | | | |
|---|---|---|---|---|
| 3,647,645 A | * | 3/1972 | Carrillo ................ | C25D 11/022 205/118 |
| 5,587,022 A | * | 12/1996 | Black ....................... | C11D 1/72 134/26 |
| 5,928,795 A | | 7/1999 | Spellane et al. | |

(Continued)

FOREIGN PATENT DOCUMENTS

| | | |
|---|---|---|
| CA | 2904222 | 10/2014 |
| JP | 2005528485 A | 9/2005 |

(Continued)

OTHER PUBLICATIONS

ASTM International, Arrhenius Equation, ASTM Dictionary of Engineering Science & Technology 33 (2005).*

(Continued)

*Primary Examiner* — Brian W Cohen
*Assistant Examiner* — Ho-Sung Chung
(74) *Attorney, Agent, or Firm* — Moore Intellectual Property Law, PLLC

(57) ABSTRACT

This disclosure relates generally to the discovery of improved methods of reducing corrosion on metals and metal alloys without using hexavalent chromium reagents. More particularly, the disclosure relates to preparing corrosion resistant metals using doped conducting polymers such as polyaniline (PANI) on metal alloys such as aluminum alloys.

20 Claims, 3 Drawing Sheets

(56) References Cited

U.S. PATENT DOCUMENTS

| | | | |
|---|---|---|---|
| 5,980,723 A * | 11/1999 | Runge-Marchese | C09D 5/24 |
| | | | 205/316 |
| 6,328,874 B1 | 12/2001 | Kinlen et al. | |
| 6,942,899 B2 | 9/2005 | Kendig et al. | |
| 7,021,993 B2 | 4/2006 | Zhang et al. | |
| 7,645,401 B2 | 1/2010 | Hoshino et al. | |
| 8,101,014 B2 | 1/2012 | Kolberg et al. | |
| 8,182,874 B2 | 5/2012 | Kolberg et al. | |
| 2003/0230363 A1 * | 12/2003 | Sturgill | C23C 22/83 |
| | | | 148/243 |
| 2004/0005478 A1 * | 1/2004 | Kendig | C09D 5/08 |
| | | | 428/689 |
| 2004/0020784 A1 * | 2/2004 | Kinlen | C25D 13/00 |
| | | | 205/332 |
| 2004/0182717 A1 * | 9/2004 | Kinard | C25D 5/18 |
| | | | 205/233 |
| 2008/0272341 A1 | 11/2008 | Kinlen | |

FOREIGN PATENT DOCUMENTS

| | | |
|---|---|---|
| JP | 2006336027 A | 12/2006 |
| JP | 2008518098 A | 5/2008 |
| JP | 2010520096 A | 6/2010 |
| WO | 2010073916 A1 | 7/2010 |
| WO | 2014172004 A1 | 10/2014 |
| WO | 20140172004 A1 | 10/2014 |

OTHER PUBLICATIONS

Zaidi, Spectral and magnetic studies on the complexes of 2,5-dimercapto-1,3,4-thiadiazole (bismuthiol I) with Co(II), Ni(II), Zn(II), Cd(II) and Hg(II), 39(4) J. of Inorganic and Nuclear Chem 581 (1977).*
Webster's New World College Dictionary, dopant (2010).*
Canadian Intellectual Property Office Communication re Canadian Search Report, Application No. 2,878,540, dated Mar. 7, 2016.
Wikipedia; Anodizing definition; accessed online Jan. 8, 2014; 9pp.
Antonijevic, et al.; Copper Corrosion Inhibitors. A review; Int. J. Electrochem. Sci., 3;2008; 1-28.
Biallozor, et al.; Conducting polymers electrodeposited on active metals; Synthetic Metals; 155:2005; 443-449.
Bolanca, et al.; 15th World Conference on Nondestructive Testing Roma (Italy) Oct. 15-21, 2000; Some properties of the Anodized Aluminum Surface; online access Feb. 11, 2014; pp. 1-7.
Conroy, et al.; The electrochemical deposition of polyaniline at pure aluminum: electrochemical activity and corrosion protection properties; Electrochimica Acta 48:2003; 721-732.
Epstein, Arthur J.; Corrosion Protection of Aluminum and its alloys Using Electroactive Polymers; Technical Report; 2000; 19pp.
Janssen, et al.; Normal Spectral Reflectance of Anodized Coatings on Aluminum, Magnesium, Titanium and Beryllium; Aeronautical Systems Division; Technical Report 61-147; Sep. 1961; 288 pp.
Kinlen, et al.; Emulsion Polymerization Process for Organically Soluble and Electrically Conducting Polyaniline; Macromolecules; 1998;31; 1735-1744.
Kinlen, et al.; "Smart Corrosion Protective Coatings" CRC; Final Technical Report; Abstract; Oct. 17, 2007; 26pp.
Moon, et al.; Electrochemical characteristics of the dimercaptan-poly (ethylene oxide) grafted polyaniline electrodes; Solid State Ionics 120;1999: 1-12.
Osha; Fact Sheet; Controlling Exposure to Hexavalent Chromium in Aerospace and Air Transport Painting; FS-3650; Mar. 2013; 3pp.
Pournaghi-Azar, et al.; Electropolymerization of aniline in acid media on the bar and chemically pre-treated aluminum electrodes A comparative characterization of the polyaniline deposited electrodes; Electrochimica Acta 51;2007; 422-4230.
Zarras, et al.; An Introduction to Corrosion Protection Using Electroactive Polymers in Electroactive Polymers for Corrosion Control; American Chemical Society Ste; 2003; 16 pp.
European Patent Office Communication re European Search Report, Application No. 15155273.4-1359.
Japanese Final Office Action for Application No. 2015-007555 dated Jun. 25, 2018, 7 pages.
EP Partial Search Report for Application No. 18166401.2 dated Sep. 28, 2018, 12 pgs.
Extended European Search Report dated Jan. 25, 2019 in corresponding EP Application No. 18166401.2, 11 pgs.
Communication Pursuant to Article 94(3) EPC dated Sep. 18, 2019 in the corresponding EP Application No. EP18166401.2, 7 pgs.
Office Action dated Sep. 24, 2019 in the corresponding Japanese Application No. 018-214451, with English translation, 7 pgs.
Yagan, et al., "Electrochemical synthesis of poly(N-methylaniline) on an iron electrode and its corrosion performance", Elsevier, Electrochimica Acta 53 (2008), pp. 5242-5251.
Duran, et al., "Poly(N-n1ethyl aniline) thin filn1s on copper: Synthesis, characterization and corrosion protection", Elsevier, Thin Solid Films 519 (2011), pp. 5868-5874.
D'Aprano, at al., "Steric and electronic effects in methyl and methoxy substituted polyanilines", Elsevier, 7. Electroanal. Chem., 351 (1993), pp. 145-158.

* cited by examiner

Salt fog results after 2 weeks

Reverse side salt fog results after 2 weeks

DIRECT ELECTROCHEMICAL SYNTHESIS OF DOPED CONDUCTIVE POLYMERS ON METAL ALLOYS

1. FIELD

This disclosure relates generally to the discovery of improved methods of reducing corrosion on metals and metal alloys without using hexavalent chromium reagents. More particularly, the disclosure relates to preparing corrosion resistant metals using doped conducting polymers such as polyaniline (PANI) on metal alloys such as aluminum alloys.

2. BACKGROUND

2.1. Introduction

For over ninety years the aerospace industry has relied on primers and pretreatments containing hexavalent chromium (Cr(VI)) as the most effective corrosion inhibitor for aluminum and aluminum alloys. Unfortunately, Cr(VI) is a known carcinogen and exposure can have serious health consequences including lung cancer. The U.S. Occupational Safety and Health Administration (OSHA) recommends if possible, substitution with paints and coatings that do not contain Cr(VI) ("Controlling Exposure to Hexavalent Chromium in Aerospace and Air Transport Painting" OSHA Fact Sheet FS-3650, March 2013). Accordingly, there is a long-felt need for corrosion resistant paints and coatings that do not contain Cr(VI) in both painting and maintenance. Effective alternatives to Cr(VI) for corrosion inhibition would reduce chromium use from the initial manufacturing processes, over the maintenance cycle, and to ultimate disposal processes.

2.2. Electropolymerized Conducting Polymer Coatings

Electropolymerization of aniline to produce PANI is a well-known process. Pournaghi-Azar and Habibi disclose PANI coatings on aluminum and aluminum-platinum surfaces from sulfuric acid solutions (Pournaghi-Azar and Habibi *Electrochimica Acta* 52 (2007) 4222-4230). PANI has been presented as a corrosion protection system for active metal surfaces through a passivation mechanism. For example, Biallozor and Kupniewska review electrodeposition of conducting polymers on active metals including use of PANI on aluminum for corrosion protection (Biallozor and Kupniewska *Synthetic Metals* 155 (2005) 443-449).

On aluminum alloys, PANI has been shown to function as a barrier to corrosion in its basic or de-doped form. In its doped form utilizing traditional sulfonic acid dopants, corrosion protection has not been observed due to the continuous oxidation of the metal by the film resulting in delamination. Specifically, Conroy and Breslin disclose PANI coatings prepared on pure aluminum from a tosylic acid (p-toluenesulfonic acid, $CH_3C_6H_4SO_3H$) solution (Conroy and Breslin *Electrochimica Acta* 48 (2003) 721-732). They observe the formation of aluminum oxides, however they note that "there was little evidence of any corrosion protection by the polyaniline coatings."

U.S. Pat. No. 6,328,874 (Kinlen et al.) discloses electrodeposition of PANI on aluminum and aluminum alloys with polystyrene sulfonic acid (PSSA) and sulfuric acid PSSA mixtures and the characterization of aluminum oxide coatings formed by the process.

2.3. Solution-Based Conducting Polymer Coatings

Others have reported solution deposited PANI films; PANI graft polymers with poly(ethylene oxide)(PEO); and PANI poly(ethyleneoxy)-3-aminobenzoates (PEAB) copolymer grafts with PEO; and PANI doped with 2,5-dimercapto-1,3,4-thiadiazole (DMcT) for preparation of capacitors and solid-state rechargeable batteries (Moon and Park *Solid State Ionics* 120 (1999) 1-12).

U.S. Pat. No. 6,942,899 (Kendig et al.) discloses solution deposited PANI films on aluminum or aluminum alloys doped with organic acids such as DMcT or 2-mercapto thiazoline.

3. SUMMARY

In particular non-limiting examples, the present disclosure provides a method for preparing a corrosion-resistant anodized metal surface which comprises anodizing a metal surface with a solution comprising an aniline-monomer and sealing the metal surface with a seal solution comprising a thiol inhibitor so as to form the corrosion-resistant anodized metal surface.

The disclosure also provides a method for making a doped polyaniline on a metal surface comprising electrochemically depositing an aniline-monomer on a metal surface to form a basic polyaniline, exposing the basic polyaniline on the metal surface to a thiol inhibitor so as to form a doped polyaniline on the metal surface.

The disclosure also provides an anodized metal component comprising: at least one anodized metal surface prepared by electrochemically depositing an aniline-monomer on a metal surface to form a basic polyaniline; exposing the basic polyaniline on the metal surface to a thiol inhibitor so as to form a doped polyaniline on the metal surface.

4. BRIEF DESCRIPTION OF THE FIGURES

FIG. 1 shows a schematic of polyaniline doped with thiol inhibitor DMcT. It shows how the inhibitor is released upon reduction of the polyaniline resulting from oxidation of aluminum.

FIG. 2 shows salt fog results after 2 week exposure. Panels of 2024-T3 bare aluminum were used FIGS. 2-4. The three panels on the left were anodized for 35 minutes, whereas the one on the right was anodized for 20 minutes prior to sealing.

5. DETAILED DESCRIPTION

The disclosure provides an alternative to Cr(VI) solution-based processing to prepare corrosion-resistant metals. More specifically, the disclosure relates to the preparing and doping of polyanilines on metal surfaces. In one non-limiting example PANI was successfully electropolymerized during the anodization of aluminum alloy leading to a thick PANI coating on a metal or metal oxide surface. Next a de-doping and redoping process using a thiol inhibitor, dimercaptothiadiazole, resulted in a doped PANI coating. The doped PANI coating protected the aluminum alloys from environmental corrosion.

Figure 1:
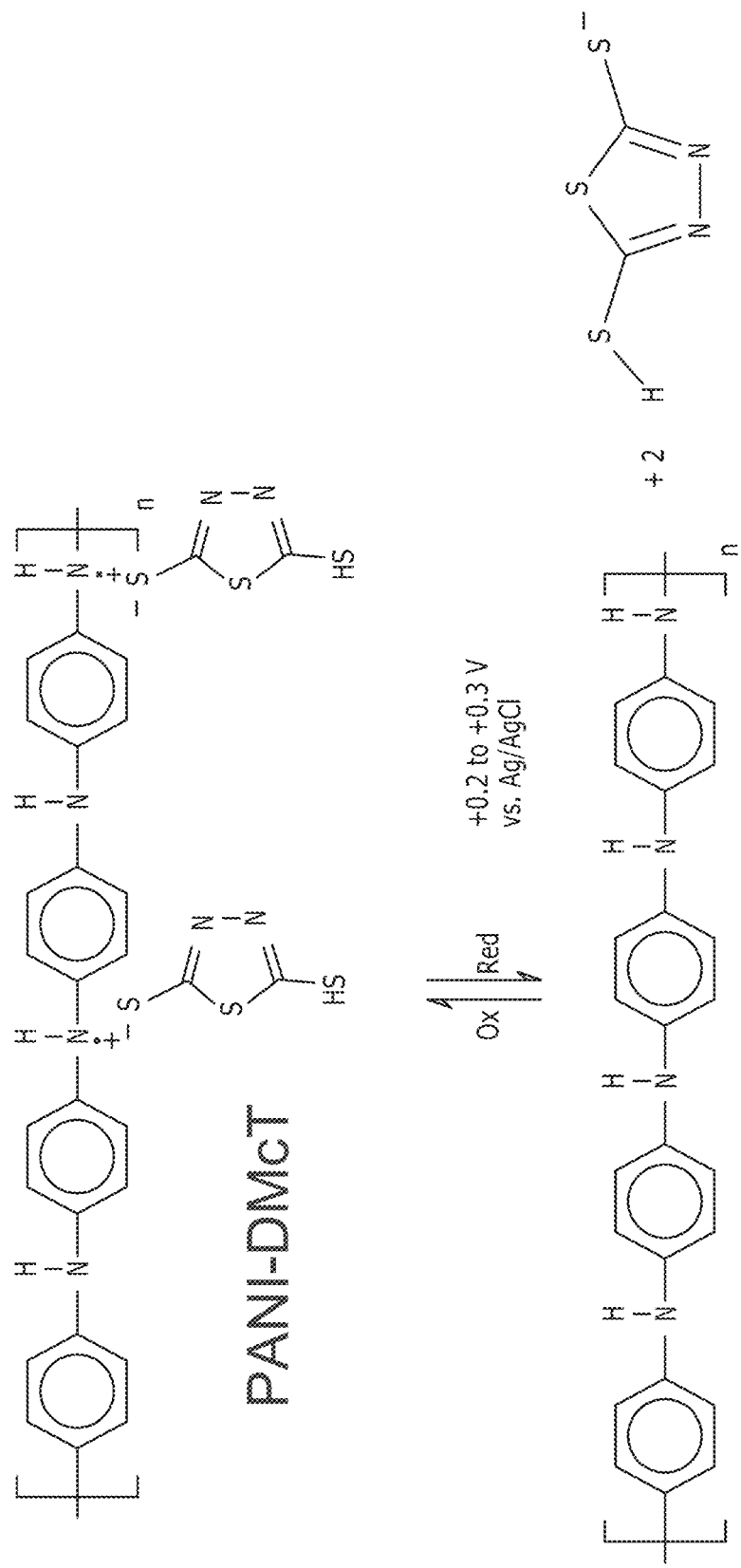

While the inventors do not intend to be bound to any particular mechanism of action, it is believed the environmental exposure electrochemically reduces the doped polyaniline and releases the free thiols which act to inhibit oxidation of the aluminum. See the exemplary schematic in FIG. 1. Similar to mechanisms proposed for other metals, the negatively charged thiol inhibitors may interact electrostatically with the positively charged metal oxide surface, which is thought to predominate on anodized aluminum under acidic conditions. See Bolanca and Hladnik "Some Properties of the Anodized Aluminum Surface" in the 15th World Conference on Nondestructive Testing Roma (Italy) 15-21 Oct. 2000. Alternatively, the free thiol groups may covalently bind to active metal sites blocking their availability for participation in the corrosion process.

In particular non-limiting examples, the present disclosure provides a method for preparing a corrosion-resistant anodized metal surface which comprises anodizing a metal surface with a solution comprising an aniline-monomer and sealing the metal surface with a seal solution comprising a thiol inhibitor so as to form the corrosion-resistant anodized metal surface.

The disclosure also provides a method for making a doped polyaniline on a metal surface comprising electrochemically depositing an aniline-monomer on a metal surface to form a basic polyaniline, exposing the basic polyaniline on the metal surface to a thiol inhibitor so as to form a doped polyaniline on the metal surface.

The disclosure also provides an anodized metal component comprising: at least one anodized metal surface prepared by electrochemically depositing an aniline-monomer on a metal surface to form a basic polyaniline; exposing the basic polyaniline on the metal surface to a thiol inhibitor so as to form a doped polyaniline on the metal surface.

In the methods or anodized metal components above, the metal surface may be an aluminum or an aluminum alloy including an aluminum clad aluminum alloy. Non-limiting examples of aluminum alloys include 2014, 2024, 2195, 2219, 2519, 6013, 7075, or 7150. It may be an alloy such as 2024-T3. Alternatively, the metal surface may be a titanium or a titanium alloy such as 6-4 or 6-6-2.

In one aspect, the aniline-monomer may be aniline. Alternatively, the aniline monomer may be an alkyl aniline such as methyl aniline, ethyl aniline, butyl aniline.

In a preferred aspect, the thiol inhibitor is a dithiol. The dithiol may be 2,5-dimercapto-1,3,4-thiadiazole (DMcT). Examples of anodized aluminum alloy metal components include 2014:(PANI):(DMcT); 2014:(polybutylaniline):(DMcT); 2014:(polyethylaniline):(DMcT); 2014:(polymethylaniline):(DMcT); 2024:(PANI):(DMcT); 2024:(polybutylaniline):(DMcT); 2024: (polyethylaniline): (DMcT); 2024: (polymethylaniline): (DMcT); 2195: (PANI): (DMcT); 2195:(polybutylaniline):(DMcT); 2195:(polyethylaniline): (DMcT); 2195:(polymethylaniline):(DMcT); 2219:(PANI): (DMcT); 2219:(polybutylaniline):(DMcT); 2219: (polyethylaniline): (DMcT); 2219: (polymethylaniline): (DMcT); 2519: (PANI): (DMcT); 2519:(polybutylaniline):(DMcT); 2519:(polyethylaniline):(DMcT); 2519:(polymethylaniline):(DMcT); 6013:(PANI):(DMcT); 6013:(polybutylaniline):(DMcT); 6013:(polyethylaniline):(DMcT); 6013: (polymethylaniline):(DMcT); 7075:(PANI):(DMcT); 7075: (polybutylaniline):(DMcT); 7075:(polyethylaniline): (DMcT); 7075:(polymethylaniline):(DMcT); 7150:(PAND: (DMcT); 7150:(polybutylaniline):(DMcT); 7150: (polyethylaniline): (DMcT); 7150: (polymethylaniline): (DMcT).

The DMcT in the seal solution may be present at a concentration of about 0.01M and about 0.1M. The seal solution has a temperature of about 20° C. to about 100° C. for the sealing step.

The methods disclosed herein may further comprise testing to validate the corrosion-resistant anodized metal surface. In an example, the testing may include measuring a resistance associated with the corrosion-resistant anodized metal surface.

5.1. Definitions

As used herein the term "aniline monomer" includes substituted and unsubstituted anilines. Non-limiting examples of aniline monomers are 2-(methylamino)aniline, 2,3-dimethylaniline, 2,4-dimethoxyaniline, 2,5 dibutylaniline, 2,5 dimethoxyaniline, 2,5 dimethylaniline, 2,5-dichloroaniline, 2-acetylaniline, 2-bromoaniline, 2-cyclohexylaniline, 2-dimethylaminoaniline, 2-ethylthio aniline, 2-methyl-4-methoxyc arbonyl aniline, 2-methylthiomethylaniline, 2-thiomethylaniline, 3-(n-butanesulfonic acid) aniline, 3-acetamidoaniline, 3-amino-9-methylcarbazole, 3-aminocarbazole, 3-bromo aniline, 3-phenoxyaniline, 3-propoxymethylaniline, 4-(2,4-dimethylphenyl) aniline, 4-acetamidoaniline, 4-amino carbazole, 4-aminoaniline, 4-benzylaniline, 4-bromoaniline, 4-carboxyaniline, 4-ethylthioaniline, 4-mercaptoaniline, 4-phenoxyaniline, 4-phenylthioaniline, 4-propanoaniline, 4-trimethylsilyl aniline, 5-chloro-2-ethoxy-aniline, 5-chloro-2-methoxy-aniline, alkyl aniline, aniline, ethylaniline, m-butylaniline, m-hexylaniline, m-octylaniline, m-toluidine, methylaniline, N hexyl-m-toluidine, N-(paraaminophenyl) aniline, N,N dimethylaniline, N-hexyl aniline, N-methyl aniline, N-methyl o-cyanoaniline, N-methyl-2,4-dimethylaniline, N-octyl-m-toluidine, N-propyl aniline, N-propyl m-toluidine, o-cyano aniline, o-ethoxy aniline, o-ethylaniline, o-toluidine, or tetrahydronaphthyl aniline.

As used herein the term "thiol inhibitor" includes monothiols, dithiols, triols, polythiols, thiol dimers, thiol trimers, thiol polymers, and salts thereof. It includes monothiols of the general formulation RSH, where R is an organic radical and may disassociate into RS-H+. A non-limiting example of a monothiol is 2-mercaptothiazoline. Dithiols have the general formulation HSRSH, where R is any organic radical. Dithiols may disassociate into HSRS-H+. Non-limiting examples of thiols are 1-(4-hydroxypheny 1)-1H-tetrazol-5 -thiol, 1,3,4 thiadiazole, 11-perfluorobutylundecanethiol, 1-dodecanethiol, 1-phenyl-2,5-dithiohydrazodiearbonamide, 1-pyrollidinec arbodithioic acid, 2 mercapto-5-nitro benzimidazole, 2-({6-Methyl-7-[(E)-phenyldiazenyl]-5H-[1,2,4]triazolo [3,4-b][1,3,4]thiadiazin-3-yl} methyl) phthalazin- 1(2H)-one, 2,1,3-benzothiazole, 2,5-dimercapto-1,3,4-thiadiazole (DMcT)(bismuthiol), 2-[(5-Mercapto-4H-1,2,4-triazol-3-yl)methyl]phthalazin-1(2H)-one, 2-[(6-Phenyl-5H-[1,2,4]triazolo [3,4-b] [1,3,4] thiadiazin-3-yl) methyl] phthalazin-1(2H)-one, 2-[(7-Anilino-5H-[1,2,4]triazolo [3,4-b] [1,3,4]thiadiazin-3-yl) methyl] phthalazin-1(2H)-one, 2-amino-5 -ethyl-1,3,4-thiadiazole (AETDA), 2-amino-5-ethylthio-1,3,4-thiadiazole (AETD), 2-mercapto-5-methylbenzimidazole, 2-mercaptobenzoazole, 2-mercaptobenzoimidazole (MBI), 2-mercaptobenzothiazole (MBT), 2-mercaptobenzoxazole, 2-mercaptoethanesulfonic acid, 2-thiouracil(TUr), 3-amino 5-methylthio 1,2,4-triazole (AMTT), 3-amino mercapto 1,2, 4-triazole(AMT), 3-aminobenzenethiol (3-A-BT), 5-(3',4'dimetoxybenzylidene)-2,4-dioxotetrahydro-1,3-thiazole (MBDT), (3-mercaptopropyl)trimethoxysilane (MPTS), 5-(3'-thenylidene)-2,4-dioxotetrahydro-1,3-thiazole (TDT), 5-(4'-isopropylbenzylidene)-2,4-dioxotetrahydro-1,3-thiazole(IPBDT), 5-(phenyl)-4H-1,2,4-triazole-3-thiole (PTAT), 5-amino-1,3,4,-thiadiazole-2-thiol, 5-benzylidene-2,4-dioxotetrahydro-1,3-thiazole (BDT), 5-mercapto-1-methyl-tetrazole (5Mc-1Me-T), 5-mercapto-1-phenyl-tetrazole (5Mc-1Ph-T), 5-methyl-thiouracil (MTUr), 6-ethoxy-2-mercaptobenzothiazole, benzenethiol (BT), benzothiazole, bis-(1-benzotriazolymethylene)-(2,5-thiadiazoly)-disulfide (BBTD), cysteine (Cys), diethyldithiocarbamic acid, dimethyldithiocarbamic acid, dithiouracil (DTUr), dodecanethiol, n-dodecanethiol (DT), octadecanethiol (ODT), o-ethyl xanthic acid, ortho-$NH_2$2-aminobenzenethiol (2-A-BT), para-$CH(CH_3)_2$ 4-isopropylbenzenethiol (4-IP-BT), para-CHs 4-methylbenzenethiol (4-M-BT), para-F 4-fluorobenzenethiol (4-F-BT), para-$NH_2$ 4-aminobenzenethiol (4-A-BT), para-$NHCOCH_3$ 4-acetamidobenzenethiol (4-AA-BT), phenyl isothiocyanate, propane-1,3-dithiol (PDT), propanethiol, thiosemicarbazide, and Vanlube 829 (5-[(2-thioxo-3H-1,3,4-thiadiazol-5-yl)disulfanyl]-3H-1,3,4-thiadiazole-2-thione). See also Antonijevic and Petrovic *Int J Electrochem Soc* 3 (2008) 1-28.

5.2. Metals and Metal Alloys

The aluminum alloys of the disclosure may be binary, ternary, quaternary or other alloys with elements such as copper, iron, lithium, magnesium, manganese, nickel, silicon, silver, vanadium, zinc, or zirconium. Examples of aluminum alloys include but are not limited to 1100, 1350, 2014*, 2024*, 2195*, 2219*, 2519*, 3003, 3104, 3105, 5052, 5083, 5182, 5657, 6022, 6111, 6013*, 6061, 6063, 6201, 7005, 7075*, 7150*, 8079, 8011 (* indicates usage in the aerospace industry, see Sanders (2012) "Aluminum and Aluminum Alloys" in *Kirk-Othmer Encyclopedia of Chemical Technology*, New York: John Wiley, pp. 1-64). Preferred aluminum alloys are alloys with copper (0.8-6.5%), manganese (0.0-0.8%), and magnesium (0.2-2.5%). Preferred titanium alloys include 6-4 and 6-6-3. Other metal or metal alloys useful in the disclosure include hafnium, niobium, tantalum, or zirconium.

5.3. Anodizing and Sealing Methods

The anodizing bath liquid comprises a mixture of water and an aniline-monomer. The composition for the bath liquid comprises water; an aniline monomer (such as aniline) at a concentration of from about 0.1 M in the aniline-monomer to saturated in the aniline-monomer, preferably from about 0.2 M to about 0.8 M in the aniline-monomer and more preferably from about 0.4 M to about 0.6 M in the aniline-monomer.

During operation, the electrodes are supplied with direct current from a constant voltage source. The anodization is carried out under potentiostatic conditions with the voltage held constant and with the cell current constantly dropping as the cell resistance increases due to the formation of the coating on the metal surface. Preferably, the cell voltage is initially ramped up from close to 0 V to the operating voltage at the start of the anodization. Such ramping can be done within the first few minutes of operation. In some examples, the voltage may be ramped for about 1 to about 2 minutes. Controlled potential electrolysis of the mixture is generally carried out at an electrical potential between the anode and cathode of from about 5 volts to about 60 volts, preferably from about 10 volts to about 40 volts, and more preferably from about 15 volts to about 25 volts. It is preferable that the current density during the anodization be from about 10 to about 25 milliamps/$cm^2$, or higher. Although one example of the present disclosure is carried out at a controlled potential, one skilled in the art will readily recognize that the method may also be performed at a constant current or with variable current or potential.

The anodization of the present disclosure is carried out at a temperature from about 5° C. to about 40° C.; preferably from about 10° C. to about 30° C.; and most preferably, from about 18° C. to about 26° C. The bath liquid is usually cooled to maintain the desired temperature. The cooling can be carried out by any conventional cooling method, such as cooling coils in the bath, or by circulation of the bath liquid through an external cooling bath. In a preferred embodiment, the bath liquid may be agitated during anodization. However, the disclosure does not require agitation. In some examples, agitation may be used for temperature control. Evolution of hydrogen at the cathode often provides sufficient agitation and mixing for a successful anodization.

The anodization is allowed to proceed at least until a coating of a thickness sufficient to provide corrosion protection is formed on the metal surface. This usually takes from about 5 min. to about 60 min and a conventional time for the formation of an effective coating is about 15 min to about 40 min. The overall thickness is preferably from about 0.01 mil to about 1.0 mil, more preferably from about 0.1 mil to about 0.8 mil and even more preferably from about 0.3 mil to about 0.5 mil.

When formation of the corrosion resistant coating is complete, the cell voltage is turned off and the coated metal is removed from the anodization bath. After the coating is formed, it is preferred that it not be dried before being "sealed". Sealing is a well-known process that is commonly used to complete the conventional anodization process for metal parts.

The thiol inhibitor sealer solution may have a thiol present in a concentration of about $5\times10^{-6}$ M to about 0.1 M in the thiol inhibitor preferably from about $1\times10^{-5}$ M to about $1\times10^{-2}$ M in the thiol inhibitor, and more preferably from about $1\times10^{4}$ M to about $1\times10^{-3}$ M in the thiol inhibitor. In some examples, the solution will be saturated in the thiol inhibitor.

In some examples, the sealing is from about 20° C. to about 100° C.; preferably from about 80° C. to about 100° C.; and most preferably, from about 90° C. to about 100° C.

In some examples, the sealing solution may have a pH of about 5.0 to about 7.5.

Unless defined otherwise, all technical and scientific terms used herein have the same meaning as commonly understood by one of ordinary skill in the art to which this disclosure belongs. The article "a" and "an" are used herein to refer to one or more than one (i.e., to at least one) of the grammatical object(s) of the article. By way of example, "an element" means one or more elements.

Throughout the specification the word "comprising," or variations such as "comprises" or "comprising," will be understood to imply the inclusion of a stated element, integer or step, or group of elements, integers or steps, but not the exclusion of any other element, integer or step, or group of elements, integers or steps. The present disclosure may suitably "comprise", "consist of", or "consist essentially of", the steps, elements, and/or reagents described in the claims.

It is further noted that the claims may be drafted to exclude any optional element. As such, this statement is intended to serve as antecedent basis for use of such exclusive terminology as "solely", "only" and the like in connection with the recitation of claim elements, or the use of a "negative" limitation.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the disclosure. The upper and lower limits of these smaller ranges may independently be included or excluded in the range, and each range where either, neither or both limits are included in the smaller ranges is also encompassed within the disclosure, subject to any specifically excluded limit in the stated range. Where the stated range includes one or both of the limits, ranges excluding either or both of those included limits are also included in the disclosure.

The following Examples further illustrate the disclosure and are not intended to limit the scope of the disclosure. In particular, it is to be understood that this disclosure is not limited to particular examples described, as such may, of course, vary. It is also to be understood that the terminology used herein is for the purpose of describing particular examples only, and is not intended to be limiting, since the scope of the present invention will be limited only by the appended claims.

6. EXAMPLES

6.1. Experimentals

3"×6"×0.032" 2024-T3 bare aluminum panels were solvent wiped with methyl n-propyl ketone (MPK), alkaline cleaned, deoxidized and anodized at various time intervals at 19 volts in 10% sulfuric acid solution containing aniline at a concentration of 28.6 grams/liter (0.31 M). After the anodization process, the panels were rinsed in deionized water and sealed at various time intervals in a saturated solution of DMcT (12.5 grams/liter)(0.008 M) adjusted to pH 6 at a temperature of ca 100° C. Control panels were anodized without aniline and sealed in either hot DI water or 5% potassium dichromate.

Resistances were measured with a Keithly high resistance meter, and electrochemical measurements were performed using standard methods. Standard ASTM B 117 salt fog was employed to verify corrosion resistance compare to controls.

6.2. Results

6.3. Salt Fog Results

Figure 2:
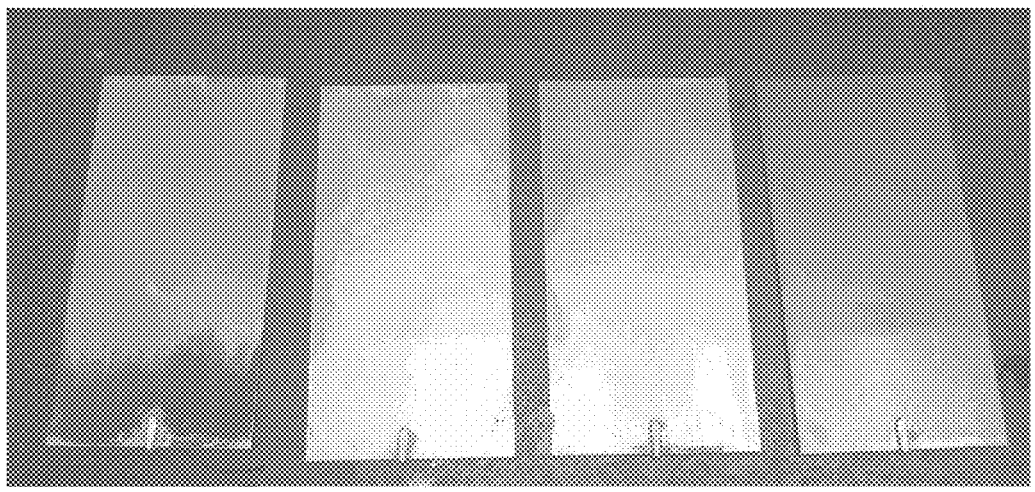
Figure 3:
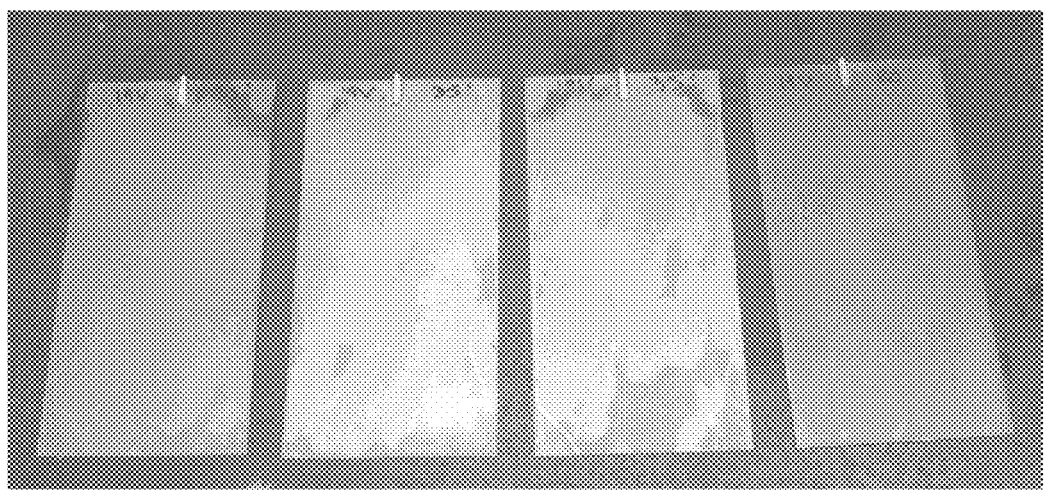
FIG. 3 shows the reverse sides of the panels shown in FIG. 2.

FIG. 2 shows the salt fog (conditions specified in ASTM B 117) results after 2 weeks of exposure. The three panels on the left were anodized for 35 minutes, whereas the one on the right was anodized for 20 minutes prior to sealing. FIG. 3 shows the reverse sides of the panels shown in FIG. 2.

Clearly, as shown in FIG. 2 and FIG. 3, the panels anodized for 35 minutes maintain their doping (as indicated by the green color) after salt fog exposure, while the panel anodized for 20 minutes does not (as indicated by the blue color). The dark brown material at the bottom of the first panel of FIG. 2 is unknown.

6.4. Optical Reflectance

Figure 4:
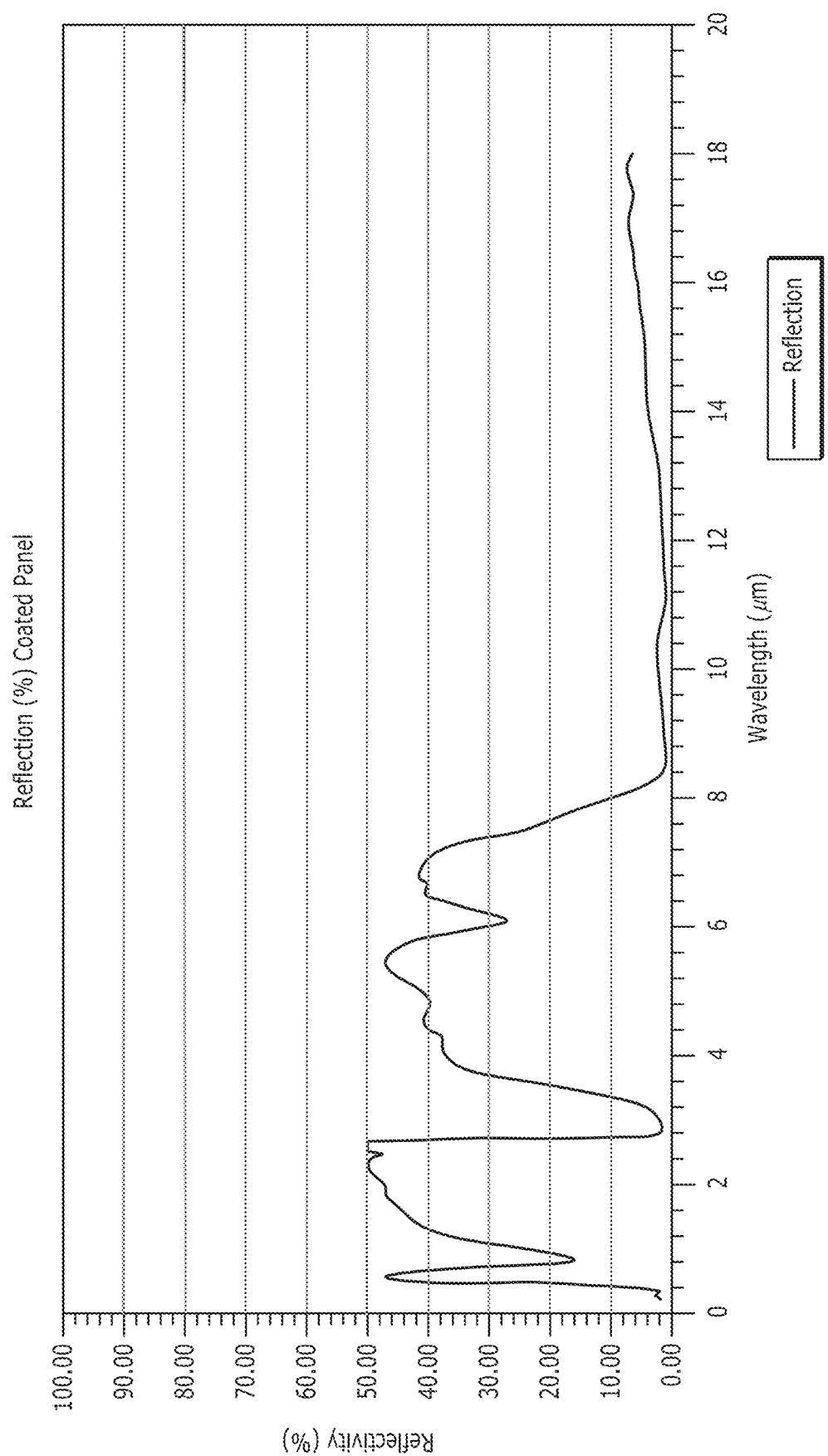
FIG. 4 shows the optical reflectance of a PANI-DMcT panel.

Using standard methods, the optical reflectance was analyzed. FIG. 4 shows the optical reflectance analysis for a PANI-DMcT panel. The optical reflectance is similar to the literature for anodized aluminum except for the peak at about 0.5 micron and the magnitude of the optical reflectance is lower for the PANI-DMcT panel. The reflectance analysis was performed on a Labsphere Integrating Sphere (North Sutton, N.H.) attachment connected to a Nicolet 6700 FTIR (Thermo Fisher Scientific, Inc).

6.5. Conclusions

Polyaniline was successfully electropolymerized during the anodization of 2024 aluminum alloy. The resulting coating was doped in the sulfuric acid/aniline anodization bath, and readily de-doped by rinsing with water. Sealing the PANI coated oxide in DMcT re-doped the PANI as indicated by the change of color from blue to yellow-green. The coatings were initially conductive, but lost their conductivity over time. Salt fog results indicate that a thicker oxide remains doped for a longer period of time versus a thinner oxide.

It is to be understood that, while the invention has been described in conjunction with the detailed description, thereof, the foregoing description is intended to illustrate and not limit the scope of the invention. Other aspects, advantages, and modifications of the invention are within the scope of the claims set forth below. All publications, patents, and patent applications cited in this specification are herein incorporated by reference as if each individual publication or patent application were specifically and individually indicated to be incorporated by reference.

What is claimed is:

1. A method for preparing a corrosion-resistant anodized metal surface, the method comprising:
    anodizing a metal surface with a bath liquid comprising water, sulfuric acid, and an aniline-monomer to form a corrosion-resistant coating of a doped polyaniline (PANI) on the metal surface;

TABLE 1

Anodization/Seal parameters and Results

| Panel No. | Anodization Time (minutes) | Anodization Temp. (° F.) | Anodization Voltage | Seal Time (minutes) | Seal Temp. (° F.) | Color | Initial Resistance, Ohms |
|---|---|---|---|---|---|---|---|
| 1 | 30 | 82 | 19 | 30 | 212 | Teal Green | Not meas. |
| 2 | 30 | 94 | 19 | 30 | 200 | Teal Green | 30-40M Ohm |
| 3 | 20 | 84-104 | 19 | 5 | 212 | Teal Green | Greater than 40M |
| 4 | 20 | 84-104 | 19 | 5 | 212 | Teal Green | Greater than 40M |
| 5 | 28 (no aniline) | 80-98 | 19 | 28 | 212 | Light Yellow | Not meas. |
| 6 | 28 (no aniline) | 80-98 | 19 | 28 (water only) | 212 | None | Not meas. |
| 7 | 30 | 76-84 | 19 | 20 | 212 | Yellow-green | 12M Ohm |

Table 1 summarizes process parameters for anodizing and sealing steps. In each case utilizing the aniline/sulfuric acid batch, a green-blue teal coating was obtained. The coating turned blue (de-doped) when rinse with DI water, and turned green again (became doped) when sealed in DMcT.

de-doping the doped PANT of the anodized metal surface by rinsing the anodized metal surface with deionized (DI) water such that the corrosion-resistant coating of the doped PANI becomes de-doped and non-conducting; and re-doping the de-doped PANI of the rinsed anodized metal surface by sealing the rinsed anodized metal surface with a seal solution consisting essentially of water and a dimercaptothiadiazole inhibitor at a temperature of about 80° C. to about 100° C. so as to form a re-doped conductive corrosion-resistant PANI coating on the rinsed anodized metal surface, wherein the dimercaptothiadiazole inhibitor is used as a dopant to form the re-doped conductive corrosion-resistant PANI coating.

2. The method of claim 1, wherein the metal surface comprises an aluminum or an aluminum alloy.

3. The method of claim 2, wherein the aluminum or aluminum alloy metal is an aluminum clad aluminum alloy.

4. The method of claim 1, wherein the metal surface comprises a titanium or a titanium alloy.

5. The method of claim 1, wherein the aniline-monomer is aniline.

6. The method of claim 1, wherein the bath liquid is saturated.

7. The method of claim 1, wherein the dimercaptothiadiazole inhibitor is in the seal solution at a concentration of about 0.01M and about 0.1M.

8. The method of claim 1, wherein the seal solution has a temperature of about 2090° C. to about 100° C.

9. The method of claim 1, further comprising testing to validate the corrosion-resistant anodized metal surface.

10. The method of claim 1, wherein the metal surface is anodized in a bath to form the corrosion-resistant coating, the bath having a temperature of about 18° C. to about 26° C. and consisting essentially of the water, the sulfuric acid, and the aniline-monomer.

11. The method of claim 10, wherein the anodized metal surface is rinsed while still wet from the bath, and wherein the seal solution is saturated.

12. The method of claim 11, wherein the de-doped PANI is re-doped while still wet from the rinsing.

13. A method for making a doped polyaniline on a metal surface comprising:

electrochemically depositing an aniline-monomer on a metal surface to form a corrosion-resistant coating of a doped polyaniline (PANI) on the metal surface using a bath liquid comprising water, sulfuric acid, and the aniline-monomer;

de-doping the doped PANI by rinsing the coated metal surface with deionized (DI) water such that the corrosion-resistant coating of the doped PANI becomes de-doped and non-conducting; and re-doping the rinsed metal surface by exposing the de-doped PANI on the rinsed metal surface to a dimercaptothiadiazole inhibitor so as to form a re-doped conductive corrosion-resistant PANI coating on the rinsed metal surface by sealing the rinsed metal surface with a seal solution consisting essentially of water and the dimercaptothiadiazole inhibitor at a temperature of about 80° C. to about 100° C., wherein the dimercaptothiadiazole inhibitor is used as a dopant to form the re-doped conductive corrosion-resistant PANI coating.

14. The method of claim 13, wherein the metal surface comprises an aluminum or an aluminum alloy.

15. The method of claim 14, wherein the aluminum or aluminum alloy metal is an aluminum clad aluminum alloy.

16. The method of claim 13, wherein the metal surface comprises a titanium or a titanium alloy.

17. The method of claim 13, wherein the aniline-monomer is aniline.

18. The method of claim 13, wherein the seal solution is saturated with the dimercaptothiadiazole inhibitor.

19. The method of claim 13, further comprising measuring a resistance associated with the sealed metal surface.

20. The method of claim 13, wherein the re-doping is performed at a temperature of about 90° C. to about 100° C.

* * * * *

UNITED STATES PATENT AND TRADEMARK OFFICE
CERTIFICATE OF CORRECTION

PATENT NO. : 10,557,210 B2
APPLICATION NO. : 14/188259
DATED : February 11, 2020
INVENTOR(S) : Patrick John Kinlen and Lawrence Michael Lawless It is certified that error appears in the above-identified patent and that said Letters Patent is hereby corrected as shown below:

In the Claims

Column 9, Claim 8, Line 29, "2090°" should read --90°--.

Signed and Sealed this
Nineteenth Day of May, 2020

Andrei Iancu
*Director of the United States Patent and Trademark Office*